US012425838B2

(12) United States Patent
Xie et al.

(10) Patent No.: US 12,425,838 B2
(45) Date of Patent: Sep. 23, 2025

(54) METHOD AND APPARATUS FOR ESTABLISHING COMMUNICATION CONNECTIONS

(71) Applicant: SHANGHAI TUGE DATA TECHNOLOGY CO., LTD., Shanghai (CN)

(72) Inventors: Yihuang Xie, Shanghai (CN); Kaihang Wang, Shanghai (CN); Hao Zhou, Shanghai (CN)

(73) Assignee: SHANGHAI TUGE DATA TECHNOLOGY CO., LTD., Shanghai (CN)

( * ) Notice: Subject to any disclaimer, the term of this patent is extended or adjusted under 35 U.S.C. 154(b) by 315 days.

(21) Appl. No.: 18/033,340

(22) PCT Filed: Oct. 14, 2021

(86) PCT No.: PCT/CN2021/123684
§ 371 (c)(1),
(2) Date: Apr. 23, 2023

(87) PCT Pub. No.: WO2022/116696
PCT Pub. Date: Jun. 9, 2022

(65) Prior Publication Data
US 2023/0396988 A1     Dec. 7, 2023

(30) Foreign Application Priority Data

Dec. 3, 2020     (CN) .......................... 202011391949.0

(51) Int. Cl.
*H04W 8/18*     (2009.01)
*H04W 8/20*     (2009.01)
(52) U.S. Cl.
CPC ................................ *H04W 8/205* (2013.01)

(58) Field of Classification Search
CPC ....... H04W 12/75; H04W 8/205; H04W 4/60; H04W 4/50; H04W 12/72; H04W 12/40; H04W 8/183; H04W 12/06; H04L 69/40
See application file for complete search history.

(56) References Cited

U.S. PATENT DOCUMENTS 10,433,156 B1     10/2019   Long et al.
2005/0108534 A1*   5/2005   Bajikar ................. H04L 9/0844
                                                713/172

(Continued)

FOREIGN PATENT DOCUMENTS

CN     104994522 A     3/2015
CN     105163805 A     12/2015
(Continued)

OTHER PUBLICATIONS

IP.com search History (Year: 2025).*

*Primary Examiner* — Moustapha Diaby
(74) *Attorney, Agent, or Firm* — Ming Jiang; MM IP SERVICES LLC

(57) ABSTRACT

Present invention relates to an apparatus and a method for establishing communication connections. The method includes: in response to a failure of a SIM card, acquiring first KI card information, establishing a first communication connection to a cloud SIM card management platform based on the first KI card information; acquiring cloud SIM card information from the cloud SIM card management platform over the first communication connection; and establishing a second communication connection based on the cloud SIM card information. In the case that the multi-SIM terminal device establishes the second communication connection based on the cloud SIM card information, the first communication connection may be disconnected, and the KI card information may be released. With the solutions, a success (Continued)

rate of establishing the first communication connection may be ensured on the premise of saving fees for users.

11 Claims, 6 Drawing Sheets

(56) References Cited

U.S. PATENT DOCUMENTS

| | | | | |
|---|---|---|---|---|
| 2007/0298801 A1* | 12/2007 | Kim | ............... | H04W 60/00 |
| | | | | 455/436 |
| 2010/0136967 A1* | 6/2010 | Du | ............... | H04W 8/205 |
| | | | | 455/432.1 |
| 2011/0270747 A1* | 11/2011 | Xu | ............... | H04M 15/00 |
| | | | | 705/40 |
| 2015/0004967 A1* | 1/2015 | Jiang | ............... | H04W 76/10 |
| | | | | 455/433 |
| 2017/0127270 A1* | 5/2017 | Hao | ............... | H04W 76/15 |
| 2019/0028885 A1* | 1/2019 | Wu | ............... | H04W 8/183 |

FOREIGN PATENT DOCUMENTS

| | | |
|---|---|---|
| CN | 105338515 A | 2/2016 |
| CN | 107306387 A | 10/2017 |
| CN | 111866778 A | 10/2020 |
| CN | 112770314 A | 5/2021 |
| WO | WO2018000560 A1 | 1/2018 |

\* cited by examiner

300

In response to a failure of a SIM card, acquire first KI card information, wherein in the case that locally stored roaming KI card information and non-roaming KI card information are both available, the first KI card information is the non-roaming KI card information, and in the case that the locally stored roaming KI card information is available whereas the non-roaming KI card information is not available, the first KI card information is the roaming KI card information — S310

Establish a first communication connection to a cloud SIM card management platform based on the first KI card information — S320

Acquire cloud SIM card information from the cloud SIM card management platform over the first communication connection — S330

Eastablish a second communication connection based on the cloud SIM card information — S340

FIG. 3

METHOD AND APPARATUS FOR ESTABLISHING COMMUNICATION CONNECTIONS

CROSS-REFERENCE TO RELATED APPLICATIONS

This is a continuation of U.S. National Stage of Application No. PCT/CN2021/123684, entitled "METHOD AND APPARATUS FOR ESTABLISHING COMMUNICATION CONNECTIONS"; filed on Oct. 14, 2021; and assigned International Publication No. WO/2022/116696; published on Jun. 9, 2022, which claims priority to Chinese Patent Application No. CN202011391949.0 of the same title; filed Dec. 3, 2020, the contents of each application in their entirety are herein incorporated by reference.

FIELD

The present disclosure relates to the field of communications, and in particular, relates to a method and apparatus for establishing communication connections.

BACKGROUND

Cloud communication is a method for establishing communication connections with no need of physical subscriber identity module (SIM) cards. A terminal may establish a first communication connection using a physical or virtual SIM card, acquire cloud SIM card information from a cloud end over the communication connection, and establish a second communication connection based on the cloud SIM card information. In this way, it is unnecessary to provide two card slots in the terminal device, and hence cost of the terminal device is lowered.

This requires the physical or virtual SIM card to be in a normal operating state. Where the physical or virtual SIM card fails, the second communication connection fails to be established. For example, the card slot of the physical SIM card fails and consequently information of the physical SIM card fails to be read; or the physical or virtual SIM card is in a roaming state and consequently, the first communication connection fails to be established. In this case, the terminal device fails to acquire the cloud SIM card information over the first communication connection, and thus fails to establish the second communication connection.

Therefore, heretofore unaddressed needs still exist in the art to address the aforementioned deficiencies and inadequacies.

SUMMARY

The present disclosure provides a method for establishing communication connections, such that a communication connection corresponding to a cloud SIM card is established in the event of a failure of a physical or virtual SIM card.

In one aspect, a method for establishing communication connections is provided. The method includes: in response to a failure of a SIM card, acquiring first key identifier (KI) card information, wherein in the case that locally stored roaming KI card information and non-roaming KI card information are both available, the first KI card information is the non-roaming KI card information, and in the case that the locally stored roaming KI card information is available whereas the non-roaming KI card information is not available, the first KI card information is the roaming KI card information; establishing a first communication connection to a cloud SIM card management platform based on the first KI card information; acquiring cloud SIM card information from the cloud SIM card management platform over the first communication connection; and establishing a second communication connection based on the cloud SIM card information.

To ensure a success rate of establishing the first communication connection, the multi-SIM terminal device generally stores a plurality of pieces of KI card information. In the case that the non-roaming KI card information in the plurality of pieces of KI card information is available, the multi-SIM terminal device may establish the first communication connection based on the non-roaming KI card information. In the case that the non-roaming KI card information in the plurality of pieces of KI card information is not available, the multi-SIM terminal device may establish the first communication connection based on the roaming KI card information. In this way, the success rate of establishing the first communication connection is ensured on the premise of saving fees for users.

In a second aspect, an apparatus for establishing communication connections is provided. The apparatus includes units in the method according to the first aspect.

In a third aspect, a device for establishing communication connections is provided. The device includes a processor and a memory. The memory is configured to store one or more computer programs. The processor, when loading and running the one or more computer programs, is caused to perform the method according to the first aspect.

In a fourth aspect, a computer program product is provided. The computer program product includes computer program code. The computer program code, when loaded and run by the device for establishing communication connections, causes the device to perform the method according to the first aspect.

In a fifth aspect, a computer-readable storage medium is provided. The computer-readable storage medium stores program code. The program code includes instructions for performing the method according to the first aspect.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the present disclosure, and features and benefits, and together with the written description, serve to explain the principles of the present invention. Apparently, the drawings described hereinafter merely illustrate some embodiments of the present disclosure. Persons of ordinary skill in the art may also derive other drawings based on the drawings described herein without any creative effort. Wherever possible, the same reference numbers are used throughout the drawings to refer to the same or like elements of an embodiment, and wherein:

FIG. 3 is a schematic diagram of a method for establishing communication connections according to certain embodiments of the present disclosure;

DETAILED DESCRIPTION

The technical solutions of the present disclosure are described in detail with reference to the accompanying drawings.

Figure 1:
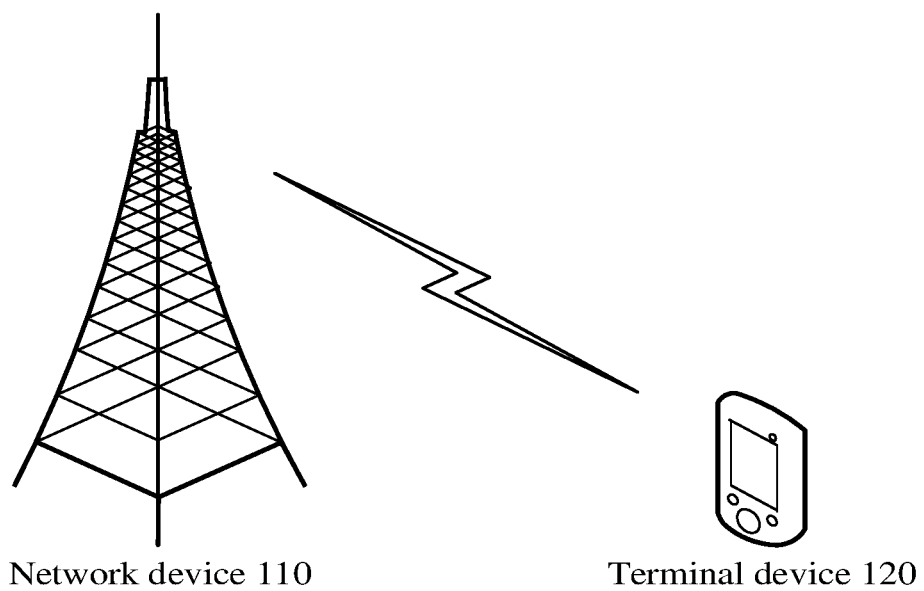
FIG. 1 is a schematic diagram of a communication system according to certain embodiments of the present disclosure.

First, an application scenario of the present disclosure is introduced. FIG. 1 is a schematic diagram of a communication system applicable to the present disclosure.

The communication system 100 includes a network device 110 and a terminal device 120. The terminal device 120 communicates with the network device 110 over electromagnetic waves.

In the present disclosure, the terminal device 120 may include various handheld devices, vehicle-mounted devices, or wearable devices having a wireless communication function, for example, user equipments (UEs, mobile stations (MS s), and the like defined in the 3rd Generation Partnership Project (3GPP).

The network device 110 may be a base station defined by 3GPP, for example, a gNodeB (gNB) defined in the Fifth Generation (5G) communication system. The network device 110 may also be a relay station, an access point, a vehicle-mounted device, a wearable device, or any other type of communication device.

The communication system 100 is only exemplarily illustrated. It should be noted that the communication system applicable to the present disclosure is not limited to the communication system 100 illustrated herein. For example, the communication system 100 may include more network devices.

The terminal device 120 may establish communication connections to the network device by using a plurality of SIM cards. In this case, the terminal device 120 may be referred to as a multi-SIM terminal device. For reduction of usage cost, the multi-SIM terminal device may establish the communication connections by using one physical SIM card and a plurality of virtual SIM cards. The virtual SIM card refers to a SIM card that is simulated by software or proxy techniques. With respect to the multi-SIM terminal device, the virtual SIM card and the physical SIM card have the same function, and are both capable of responding to a read-write request from a modem of the multi-SIM terminal device, for example, an authentication request.

Authentication is a two-way identification mechanism, and is employed to identify user identity and base station validity for accessing an operator network. The virtual SIM card may provide most of the data and algorithms (including an authentication algorithm) of the physical SIM card to the base station. However, the virtual SIM card fails to provide a KI code, and thus fails to complete authentication. One solution to this issue is to carry out authentication locally by using a KI card provided by the operator, and another solution is to complete authentication at a cloud end based on the SIM card information stored at the cloud end.

Figure 2:
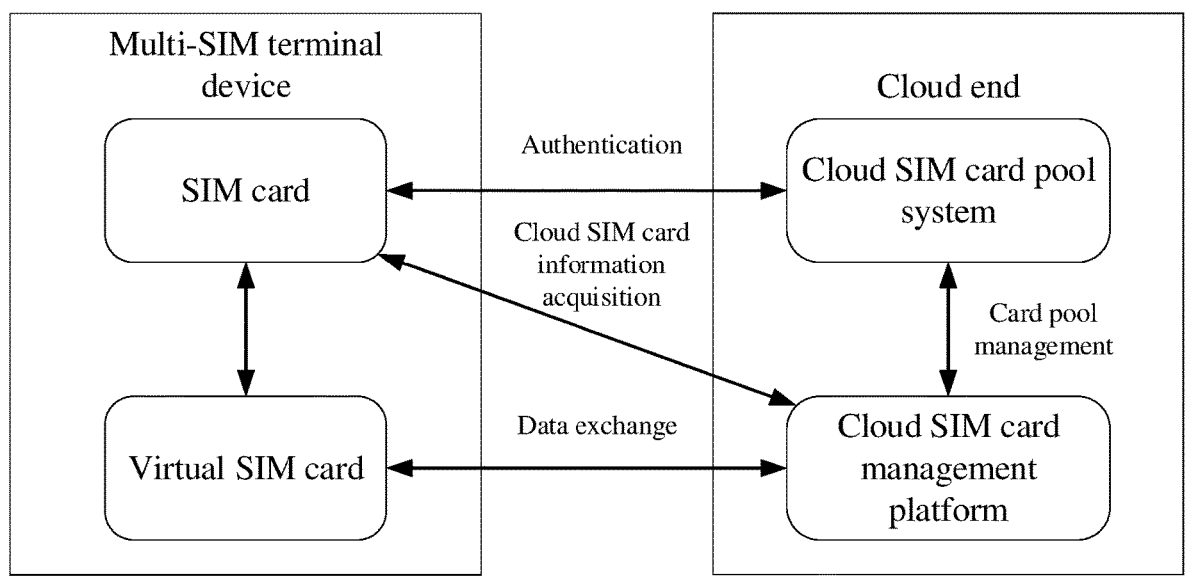
FIG. 2 illustrates a method for authenticating a virtual SIM card according to certain embodiments of the present disclosure.

Therefore, according to the difference between the authentication schemes, the virtual SIM card technology may be categorized into the KI virtual SIM card technology and the cloud virtual SIM card technology, as illustrated in FIG. 2.

When employing the cloud virtual SIM card technology, the multi-SIM terminal device firstly establishes a communication connection to the cloud end by using the physical SIM card, then acquires virtual SIM card information from a cloud SIM card management platform, and subsequently authenticates the virtual SIM card information over the communication connection to the physical SIM card. Upon completion of the authentication, a cloud SIM card pool system sends an authentication response indicative of successful authentication to the multi-SIM terminal device, and the multi-SIM terminal device is allowed to exchange data with the cloud end by using the virtual SIM card.

When employing the KI virtual SIM card technology, the multi-SIM terminal device firstly establishes a communication connection to the cloud end by using the physical SIM card, and then acquires a KI code from the cloud SIM card management platform. The multi-SIM terminal device carries out authentication locally by using an authentication algorithm and the KI code. upon successful authentication, the multi-SIM terminal device is allowed to exchange data with the cloud end by using the virtual SIM card.

As illustrated in FIG. 2, the practice of the above two methods relies on the communication connection established by the physical SIM card. In the event of a failure of the physical SIM card, even with the virtual SIM card, the communication connection to the network device fails to be established, and thus users fail to access the Internet by using the virtual SIM card.

Hereinafter, the method 300 for establishing the communication connections according to the present disclosure is described in detail with reference to FIG. 3. The method 300 may be performed by a multi-SIM terminal device. The multi-SIM terminal device may be a mobile phone, or may be any other mobile terminal having a wireless communication function. The specific form of the multi-SIM terminal device is not limited in the present disclosure.

As illustrated in FIG. 3, the method 300 includes the following steps.

In S310, in response to a failure of a SIM card, first KI card information is acquired, wherein in the case that locally stored roaming KI card information and non-roaming KI card information are both available, the first KI card information is the non-roaming KI card information, and in the case that the locally stored roaming KI card information is available whereas the non-roaming KI card information is not available, the first KI card information is the roaming KI card information.

The SIM card may be a physical SIM card or a virtual SIM card.

The failure may be originated from the manufacture of the multi-SIM terminal device. For example, some problems occur to the card slot during the manufacture of the multi-SIM terminal device, and the information of the physical SIM card fails to be read. As a result, users fail to implement communication by using the physical SIM card and the virtual SIM card.

The failure may also possibly be originated from the usage of the multi-SIM terminal device. For example, the multi-SIM terminal device falls into water or onto ground during use and the information of the physical SIM card fails to be read, or the card slot is contaminated or gets rusty and the information of the physical SIM card fails to be read. As a result, users fail to implement communication by using the physical SIM card and the virtual SIM card.

The failure may also possibly be due to that the operator does not support the network mode of the physical SIM card and the communication connection fails to be established by using the physical SIM card. As a result, users fail to implement communication by using the physical SIM card and the virtual SIM card.

The present disclosure sets no limitation to the specific form of the failure of the physical SIM card.

The multi-SIM terminal device acquires the first KI card information upon determining that the physical SIM card fails. The first KI card information may be information read by the multi-SIM terminal device from a physical KI card, or may be information of a virtual KI card read by the multi-SIM terminal device from a memory. In the case that the multi-SIM terminal device uses the virtual KI card information, there is no need to deploy a large number of physical KI cards, such that cost is reduced. In the case that the multi-SIM terminal device has a plurality of pieces of available KI card information, the multi-SIM terminal device may select one piece of available KI card information as the first KI card information.

The first KI card information may be roaming KI card information, or may be non-roaming KI card (regional KI card) information.

For example, in the case that the multi-SIM terminal device does not store the non-roaming KI card information, the multi-SIM terminal device may select one piece of roaming KI card information as the first KI card information from the plurality of pieces of roaming KI card information, to ensure that the first communication connection is successfully established.

For example, in the case that the multi-SIM terminal device stores both the roaming KI card information and the non-roaming KI card information, and is capable of establishing the first communication connection based on the non-roaming KI card information, the multi-SIM terminal device may select one piece of non-roaming KI card information as the first KI card information, such that fees may be saved for users.

Afterwards, the multi-SIM terminal device may perform the following steps.

In S320, a first communication connection to a cloud SIM card management platform is established based on the first KI card information.

Optionally, in the case that the multi-SIM terminal device selects the roaming KI card information as the first KI card information, the multi-SIM terminal device may also acquire second KI card information from the cloud end over the first communication connection. Since the second KI card information is KI card information assigned by a local operator, the second KI card information supports a local network. Afterwards, the multi-SIM terminal device disconnects the first communication connection, and re-establishes the first communication connection based on the second KI card information. In this embodiment, establishing the first communication connection based on the non-roaming KI card information (the second KI card information) saves fees for users.

In addition, in the case that the multi-SIM terminal device needs to provide the KI card information for a plurality of communication connections, the first KI card information may be used simultaneously by the plurality of communication connections, that is, one SIM card for multiple uses. Since the second KI card information is assigned by the cloud end, and the case of one SIM card for multiple uses may not occur, establishing the first communication connection based on the second KI card improves stability of the first communication connection.

In S330, cloud SIM card information is acquired from the cloud SIM card management platform over the first communication connection.

In S340, a second communication connection is established based on the cloud SIM card information.

To ensure a success rate of establishing the first communication connection, the multi-SIM terminal device generally stores a plurality of pieces of KI card information. In the case that the non-roaming KI card information in the plurality of pieces of KI card information is available, the multi-SIM terminal device may establish the first communication connection based on the non-roaming KI card information. In the case that the non-roaming KI card information in the plurality of pieces of KI card information is not available, the multi-SIM terminal device may establish the first communication connection based on the roaming KI card information. In this way, the success rate of establishing the first communication connection is ensured on the premise of saving fees for users.

Figure 4:
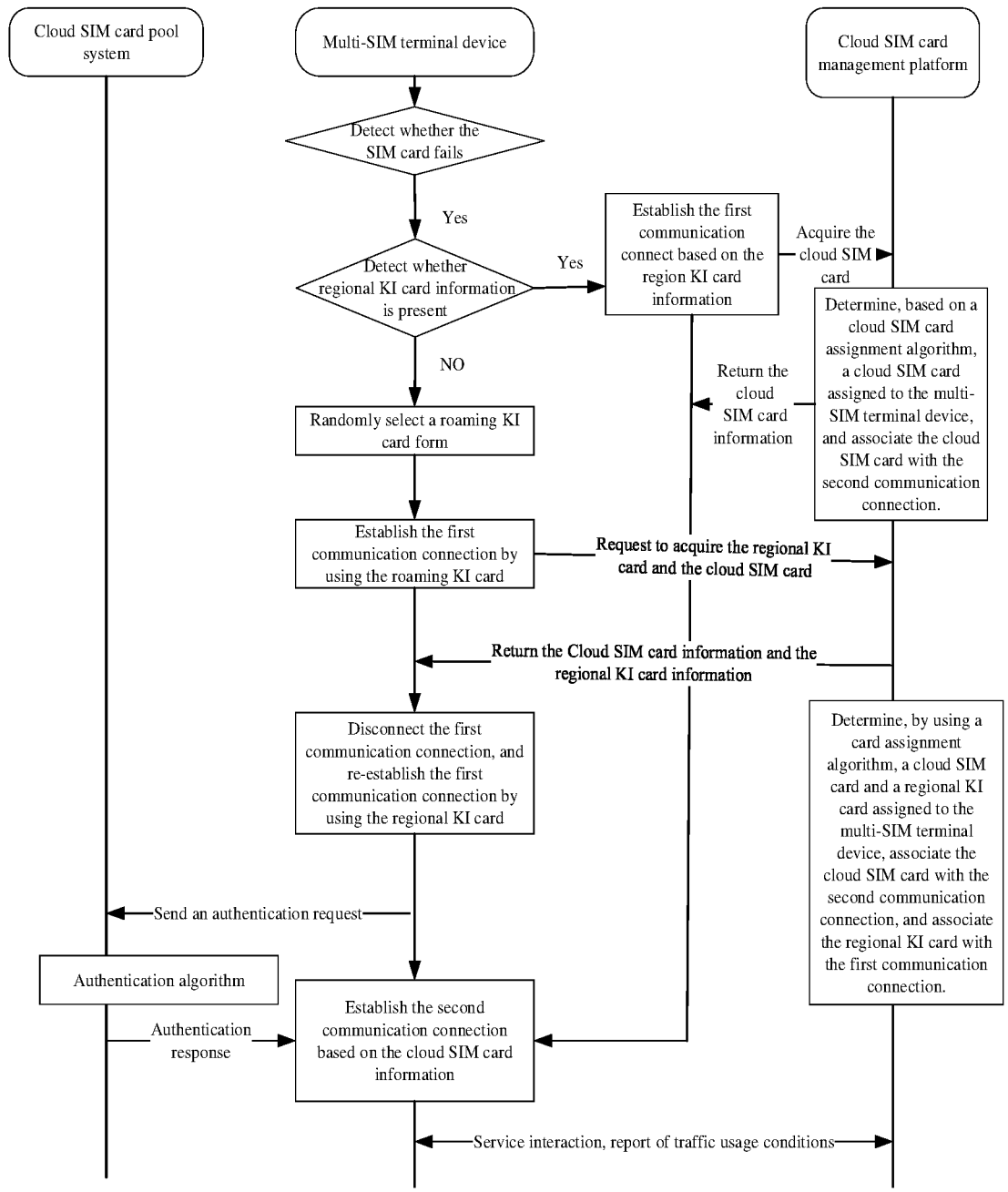
FIG. 4 is a schematic diagram of another method for establishing communication connections according to certain embodiments of the present disclosure.

Hereinafter, the method for establishing the communication connections according to the present disclosure is further described with reference to FIG. 4.

The multi-SIM terminal device pre-stores the roaming KI card information. The multi-SIM terminal device, upon power on, detects whether the SIM card fails, and in the event of a failure, detects whether regional KI card information is present.

In the case that the regional KI card information is present, the multi-SIM terminal device establishes the first communication connection, that is, a communication connection corresponding to the SIM card, based on the regional KI card information. Afterwards, the multi-SIM terminal device sends a request message to the cloud SIM card management platform over the first communication connection to acquire the cloud SIM card. The cloud SIM card management platform determines, based on a cloud SIM card assignment algorithm, a cloud SIM card assigned to the multi-SIM terminal device, associates the cloud SIM card with the second communication connection, and then sends the cloud SIM card information to the multi-SIM terminal device. The multi-SIM terminal device establishes the second communication connection based on the cloud SIM card information. In the case that a Wi-Fi access point is enabled on the multi-SIM card terminal device, Wi-Fi users may carry out service interactions with the cloud SIM card over the second communication connection, and the cloud SIM card management platform may also monitor a state of the device over the second communication connection and acquire traffic usage conditions reported by the multi-SIM terminal device.

In the case that the regional KI card information is not present, the multi-SIM terminal device may randomly select a roaming KI card from in-built roaming KI cards, and establish the first communication connection by using the roaming KI card. Afterwards, the multi-SIM terminal device sends a request message to the cloud SIM card management platform over the first communication connection to acquire the regional KI card and the cloud SIM card. The cloud SIM card management platform determines, by using a card assignment algorithm, a cloud SIM card and a regional KI card assigned to the multi-SIM terminal device, associates the cloud SIM card with the second communication connection and associates the regional KI card with the first communication connection, and then sends the cloud SIM card information and the regional KI card information to the multi-SIM terminal device. The multi-SIM terminal device may call an interface to disconnect the first communication connection, issue the regional KI card information to a modem, re-establish the first communication connection by using the regional KI card, and send the cloud SIM card information and an authentication request to the cloud SIM card pool system over the first communication connection. The cloud SIM card pool system completes authentication by using a cloud SIM card authentication algorithm, and sends an authentication response to the multi-SIM terminal device. The multi-SIM terminal device establishes the second communication connection based on the cloud SIM card information. In the case that a Wi-Fi access point is enabled on the multi-SIM card terminal device, Wi-Fi users may carry out service interactions with the cloud SIM card over the second communication connection, and the cloud SIM card management platform may also monitor a state of the device over the second communication connection and acquire traffic usage conditions reported by the multi-SIM terminal device.

Examples of establishing the communication connections according to the present disclosure are described in detail hereinabove. It may be understood that to implement the above functions, the apparatus for establishing communication connections includes corresponding hardware structures and/or software modules for implementing the functions. A person skilled in the art may envisage that various exemplary units and algorithm steps described with reference to the embodiments of the present disclosure given herein may be practiced in the form of hardware or a combination of computer software and hardware. Whether a function is implemented in the form of computer software or drive hardware depends on the specific application and the design restrictions applied to the entire system. Professional technical personnels may implement the described functions by using different methods for each specific application. However, such implementation shall not be deemed as going beyond the scope of the present disclosure.

In the present disclosure, the apparatus for establishing communication connections may be divided into various functional units with reference to the above method embodiments. For example, various functions are assigned to various functional units for implementation of these functions. functional units in the embodiments of the present disclosure may be integrated into one processing unit, or two or more than two functions are assigned to one processing unit for implementation of these functions. The integrated units above may be implemented in a form of hardware or in a form of a software functional unit. It should be noted that definition of the functional units in the present disclosure is exemplary and illustrative, which is merely division in terms of logical functionality. In practice, the division of the apparatus may be achieved in any other form.

Figure 5:
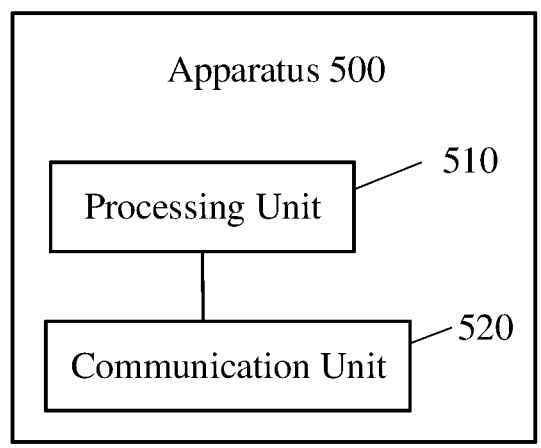
FIG. 5 is a schematic diagram of an apparatus for establishing communication connections according to certain embodiments of the present disclosure.

FIG. 5 is a schematic structural diagram of an apparatus for establishing communication connections according to the present disclosure.

The device 500 includes a processing unit 510 and a communication unit 520.

The processing unit 510 is configured to acquire KI card information in response to a failure of a SIM card.

The processing unit 510 is further configured to control the communication unit 520 to: establish a first communication connection to a cloud SIM card management platform based on the first KI card information; acquire cloud SIM card information from the cloud SIM card management platform over the first communication connection; and establish a second communication connection based on the cloud SIM card information.

Optionally, the first KI card information is roaming KI card information, and the processing unit 510 is specifically configured to acquire the first KI card information stored locally in the case that non-roaming KI card information is not stored locally.

Optionally, the processing unit 510 is further configured to control the communication unit 520 to: acquire second KI card information from the cloud SIM card management platform over the first communication connection, wherein the second KI card information is the non-roaming KI card information; disconnect the first communication connection; and establish the first communication connection based on the second KI card information.

Optionally, the first KI card information is non-roaming KI card information, and the processing unit 510 is specifically configured to acquire the first KI card information stored locally in the case that roaming KI card information and non-roaming KI card information are both stored locally.

Optionally, the first KI card information is virtual KI card information.

For details about practice of the method 300 by the apparatus 500 and the achieved beneficial effects, reference may be made to related descriptions in the above method embodiments.

Figure 6:
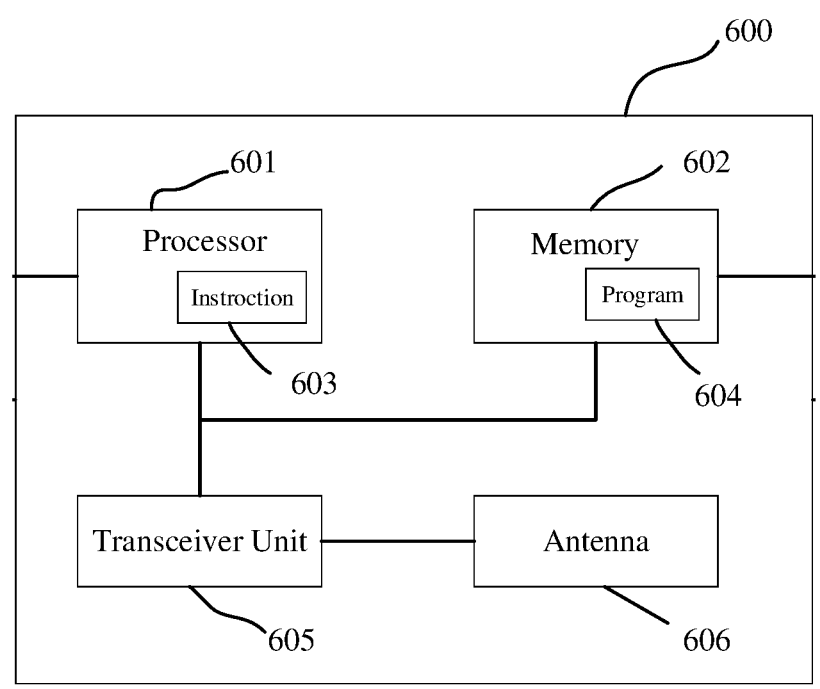
FIG. 6 is a schematic diagram of a device for establishing communication connections according to certain embodiments of the present disclosure.

FIG. 6 is a schematic structural diagram of a device for establishing communication connections according to the present disclosure. The device 600 may be employed to perform the method according to the above method embodiment, and the device 600 may be a chip or a terminal device.

The device 600 includes one or more processors 601. The one or more processors 601 support implementation, by the terminal device 600, of the method according to the method embodiment as illustrated in FIG. 2. The processor 601 may be a general purpose processor or an application-specific processor. For example, the processor 601 is a central processing unit (CPU) or a baseband processor. The baseband processor may be configured to process communication data (for example, request messages), and the CPU may be configured to control the device 600 to run a software program and process data of the software program.

The device 600 may further include a transceiver unit 605 and an antenna 606 to implement input (reception) and output (transmission) of signals.

For example, the device 600 may be a chip, the transceiver unit 605 may be an input and/or output circuit of the chip or a communication interface of the chip. The chip may serve as a component of the terminal device or any other wireless communication device.

The device 600 may include one or more memories 602 storing a program 604. The program 604 may be loaded and run by the processor 601 to generate one or more instructions 603, which, when loaded and executed, cause the processor 601 to perform the method according to the above method embodiment. Optionally, the memory 602 may also store data. Optionally, the processor 601 may also read the data stored in the memory 602. The data and the program 604 may be stored at the same storage address, or stored at different storage addresses.

The processor 601 and the memory 602 may be deployed independently or integrally. For example, the processor 601 and the memory 602 may be integrated on a system on chip (SoC).

It should be understood that various steps in the above method embodiments may be performed by means of a logic circuit in the form of hardware or by means of instructions in the form of software. The processor 601 may be a central processing unit (CPU), a digital signal processor (DSP), an application specific integrated circuit (ASIC), a field-programmable gate array (FPGA), or a programmable logic device, for example, a discrete gate or transistor logic device, or a discrete hardware component.

For details about practice of the method 200 by the device 600 and the achieved beneficial effects, reference may be made to related descriptions in the above method embodiments.

An embodiment of the present disclosure further provides a computer program product. The computer program product, when loaded and run by the processor 601, causes the processor 601 to perform the communication method according to any of the above method embodiments.

The computer program product may be stored in the memory 620, for example, a program 604. The program 604 is eventually converted to a target file executable by the processor 601 by a series of processing including pre-processing, compilation, collection, and linking.

An embodiment of the present disclosure further provides a computer-readable storage medium, which stores a computer program. The computer program, when loaded and run by a computer, causes the computer to perform the communication method according to any of the above method embodiments. The computer program may be an advanced language-programmed program or may be a runnable target program.

The computer-readable storage medium may be, for example, the memory 602. The memory 602 may be a volatile memory or a non-volatile memory, or the memory 602 may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), which serves as an external high-speed cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

A person skilled in the art would clearly acknowledge that for ease and brevity of description, the specific operation processes of the above described systems, apparatuses and units may be referenced to the relevant portions in the above described method embodiments, which are thus not described herein any further.

In several embodiments of the present disclosure, it should be understood that the disclosed system, apparatus, device, and method may be implemented in other manners. For example, some features in the method embodiment may be ignored, or not executed. The above described device embodiments are merely illustrative. For example, the unit division is merely logical function division and may be other divisions in actual practice. For example, multiple units or components may be combined or integrated into another system. In addition, coupling between the units or coupling between the components may be direct coupling or indirect coupling. The coupling includes electrical, mechanical, or other forms of connections.

It should be understood that in various embodiments of the present disclosure, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present disclosure.

In addition, the terms "system" and "network" in the specification are generally exchanged. The term "and/or" is merely an association relationship for describing associated objects, which represents that there may exist three types of relationships, for example, A and/or B may represent three situations: only A exists, both A and B exist, and only B exists. In addition, the symbol "/" generally represents an "or" relationship between associated objects before and after the symbol.

The above embodiments are merely exemplary embodiments of the technical solutions of the present disclosure, but are not intended to limit the protection scope of the present disclosure. Any modification, equivalent replacement, or improvement made without departing from the spirit and principle of the present disclosure should fall within the protection scope of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for establishing communication connections, comprising:
   in response to a failure of a subscriber identity module (SIM) card, acquiring first key identifier (KI) card information, wherein in the case that locally stored roaming KI card information and non-roaming KI card information are both available, the first KI card information is the non-roaming KI card information, and in the case that the locally stored roaming KI card information is available whereas the non-roaming KI card information is not available, the first KI card information is the roaming KI card information;
   establishing a first communication connection to a cloud SIM card management platform based on the first KI card information;
   acquiring cloud SIM card information from the cloud SIM card management platform over the first communication connection; and
   establishing a second communication connection based on the cloud SIM card information.

2. The method according to claim 1, wherein in the case that the first KI card information is the roaming KI card information, the method further comprises:
   acquiring second KI card information from the cloud SIM card management platform over the first communication connection, wherein the second KI card information is the non-roaming KI card information;
   disconnecting the first communication connection; and
   establishing the first communication connection based on the second KI card information.

3. The method according to claim 1, wherein the roaming KI card information and the non-roaming KI card information being both available comprises:
   the roaming KI card information and the non-roaming KI card information being both applicable to establishing the first communication connection.

4. The method according to claim 1, wherein the roaming KI card information being available whereas the non-roaming KI card information being not available comprises:
   the roaming KI card information being applicable to establishing the first communication connection whereas the non-roaming KI card information being not applicable to establishing the first communication connection.

5. The method according to claim 1, wherein the first KI card information is virtual KI card information.

6. An apparatus for establishing communication connections, comprising: a processing unit and a communication unit; wherein
   the processing unit is configured to:
   in response to a failure of a subscriber identity module (SIM) card, acquiring first key identifier (KI) card information, wherein in the case that locally stored roaming KI card information and non-roaming KI card information are both available, the first KI card information is the non-roaming KI card information, and in the case that the locally stored roaming KI card information is available whereas the non-roaming KI card information is not available, the first KI card information is the roaming KI card information;
   the processing unit is further configured to control the communication unit to:
   establish a first communication connection to a cloud SIM card management platform based on the first KI card information;
   acquire cloud SIM card information from the cloud SIM card management platform over the first communication connection; and
   establish a second communication connection based on the cloud SIM card information.

7. The apparatus according to claim 6, wherein the processing unit is further configured to control the communication unit to:
   acquire second KI card information from the cloud SIM card management platform over the first communication connection, wherein the second KI card information is the non-roaming KI card information;
   disconnect the first communication connection; and
   establish the first communication connection based on the second KI card information.

8. The apparatus according to claim 6, wherein the roaming KI card information and the non-roaming KI card information being both available comprises:
   the roaming KI card information and the non-roaming KI card information being both applicable to establishing the first communication connection.

9. The apparatus according to claim 6, wherein the roaming KI card information being available whereas the non-roaming KI card information being not available comprises:
   the roaming KI card information being applicable to establishing the first communication connection whereas the non-roaming KI card information being not applicable to establishing the first communication connection.

10. The apparatus according to claim 6, wherein the first KI card information is virtual KI card information.

11. A non-transitory computer-readable storage medium, storing one or more computer programs; wherein the one or more computer programs, when loaded and run by a processor, cause the processor to perform one or more of following: in response to a failure of a subscriber identity module (SIM) card, acquiring first key identifier (KI) card information, wherein in the case that locally stored roaming KI card information and non-roaming KI card information are both available, the first KI card information is the non-roaming KI card information, and in the case that the locally stored roaming KI card information is available whereas the non-roaming KI card information is not available, the first KI card information is the roaming KI card information; establishing a first communication connection to a cloud SIM card management platform based on the first KI card information; acquiring cloud SIM card information from the cloud SIM card management platform over the first communication connection; and establishing a second communication connection based on the cloud SIM card information.

* * * * *